(12) United States Patent
Wentink et al.

(10) Patent No.: US 10,652,924 B2
(45) Date of Patent: May 12, 2020

(54) UNIVERSAL RESERVATION SIGNAL FOR WIRELESS COMMUNICATIONS

(71) Applicant: QUALCOMM Incorporated, San Diego, CA (US)

(72) Inventors: Maarten Menzo Wentink, Nijmegen (NL); Didier Johannes Richard Van Nee, Tull en 't Waal (NL); Albert Van Zelst, Woerden (NL); Bin Tian, San Diego, CA (US); Hemanth Sampath, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/039,154

(22) Filed: Jul. 18, 2018

(65) Prior Publication Data

US 2019/0029042 A1 Jan. 24, 2019

Related U.S. Application Data

(60) Provisional application No. 62/534,623, filed on Jul. 19, 2017, provisional application No. 62/546,291, filed on Aug. 16, 2017.

(51) Int. Cl.
*H04W 74/08* (2009.01)
*H04L 1/18* (2006.01)
(Continued)

(52) U.S. Cl.
CPC ....... *H04W 74/0808* (2013.01); *H04L 1/1867* (2013.01); *H04L 5/0053* (2013.01); *H04L 5/0098* (2013.01); *H04L 27/0006* (2013.01); *H04L 27/2602* (2013.01); *H04W 28/26* (2013.01); *H04W 52/0216* (2013.01);
(Continued)

(58) Field of Classification Search
CPC combination set(s) only.
See application file for complete search history.

(56) References Cited

U.S. PATENT DOCUMENTS

2009/0097456 A1* 4/2009 Zhu ................. H04W 74/085
370/336
2011/0243020 A1* 10/2011 Ponnuswamy ......... H04L 41/22
370/252

(Continued)

FOREIGN PATENT DOCUMENTS

WO WO-2015094379 A1 6/2015

OTHER PUBLICATIONS

International Search Report and Written Opinion—PCT/US2018/042853—ISA/EPO—dated Oct. 2, 2018.

*Primary Examiner* — Brian D Nguyen
(74) *Attorney, Agent, or Firm* — Paradice and Li LLP

(57) ABSTRACT

Systems and methods are disclosed for a wireless device to transmit or receive a channel busy time (CBT) to or from other devices in a wireless network. For transmitting, the wireless device may determine a CBT during which a wireless channel is to be occupied, generate a universal reservation signal (URS) indicating the CBT, and transmit on the wireless channel the URS to at least one other wireless device. For receiving, the wireless device may receive on a wireless channel a URS from a second wireless device, the URS configured to indicate the CBT. The wireless device may also refrain from attempting to transmit on the wireless channel during the CBT.

26 Claims, 12 Drawing Sheets

(51) Int. Cl.
  *H04L 27/26* (2006.01)
  *H04L 5/00* (2006.01)
  *H04W 28/26* (2009.01)
  *H04W 52/02* (2009.01)
  *H04L 27/00* (2006.01)
  *H04L 1/00* (2006.01)
  *H04W 84/12* (2009.01)

(52) U.S. Cl.
  CPC ... *H04W 52/0219* (2013.01); *H04W 52/0222* (2013.01); *H04L 1/0041* (2013.01); *H04L 1/0059* (2013.01); *H04W 84/12* (2013.01)

(56) References Cited

U.S. PATENT DOCUMENTS

| | | | |
|---|---|---|---|
| 2014/0050133 | A1 | 2/2014 | Jafarian et al. |
| 2016/0007247 | A1* | 1/2016 | Lee ................... H04W 36/0066 370/331 |
| 2016/0073344 | A1 | 3/2016 | Vutukuri et al. |
| 2016/0255643 | A1 | 9/2016 | Malik et al. |
| 2017/0289987 | A1* | 10/2017 | Seok ...................... H04W 74/00 |
| 2018/0092128 | A1* | 3/2018 | Um ................... H04W 74/0808 |
| 2018/0184435 | A1* | 6/2018 | Cariou .............. H04W 52/0203 |
| 2018/0270038 | A1* | 9/2018 | Oteri ..................... H04L 5/0037 |
| 2018/0279365 | A1* | 9/2018 | Wang ................ H04W 74/0808 |
| 2019/0075596 | A1* | 3/2019 | Ye ......................... H04L 5/0053 |

* cited by examiner

Universal Reservation Signal 300

Training Field 302

Short Training Field 312

Long Training Field 314

Information Field 304

1000

Receive on a wireless channel a URS from a second wireless device, the URS configured to indicate a CBT during which the wireless channel is to be occupied. (1002)

Refrain from transmitting on the wireless channel during the CBT. (1004)

UNIVERSAL RESERVATION SIGNAL FOR WIRELESS COMMUNICATIONS

CROSS-REFERENCE TO RELATED APPLICATIONS

This Patent Application claims priority to U.S. Provisional Patent Application No. 62/534,623 entitled "UNIVERSAL RESERVATION SIGNAL FOR WIRELESS COMMUNICATIONS" filed on Jul. 19, 2017, and U.S. Provisional Patent Application No. 62/546,291 entitled "UNIVERSAL RESERVATION SIGNAL FOR WIRELESS COMMUNICATIONS" filed on Aug. 16, 2017, which are assigned to the assignee hereof. The disclosure of the prior Applications is considered part of and is incorporated by reference in this Patent Application.

TECHNICAL FIELD

The example implementations relate generally to wireless networks, and specifically to announcing channel busy times to devices in a wireless network.

BACKGROUND OF RELATED ART

A Wi-Fi network may be formed by one or more access points (APs) that provide a wireless communication channel or link with a number of client devices or stations (STAs). Each AP, which may correspond to a Basic Service Set (BSS), periodically broadcasts beacon frames to enable any STAs within wireless range of the AP to establish and/or maintain a communication link with the Wi-Fi network. Alternatively, a Wi-Fi network may be formed without an AP, thus corresponding to an Independent Basic Service Set (IBSS).

For most Wi-Fi networks, the IEEE 802.11 standards define a distributed coordination function (DCF) that instructs individual STAs (and APs) to "listen" to the medium to determine when the medium is idle (e.g., using a "carrier sense" technique). The STAs may then contend for access to the wireless medium, and the IEEE 802.11 standards also define medium contention and backoff procedures. Sensing for the wireless medium to become available and then contending for the wireless medium may cause significant delay or inefficient use of the wireless medium. Additionally, sensing requires a device to listen to the wireless medium and thus not be in a low power state.

With carrier sense, some receivers (such as receivers defined by the IEEE 802.11 standards, receivers with the License Assisted Access (LAA) feature as defined by the 4G Long Term Evolution (LTE) protocol described by the 3rd Generation Partnership Project (3GPP), or other receivers) may determine that a channel of the wireless medium is busy or occupied (energy is sensed on the wireless channel to infer that the channel is unavailable). However, use of carrier sensing to determine when a channel is busy or occupied based on the amount of energy on the channel requires inferring when the channel is occupied. For example, the minimum energy levels for detection may be required to be as low as −82 dBm for a 20 MHz channel to prevent a listening device from erroneously inferring that the channel is not occupied when signals on the channel are close to the minimum energy level. As a result, the channel may be inferred to be occupied when the channel is actually available. Additionally, the channel is not determined to be occupied until after the channel actually is occupied. For example, a wireless device may require time to sense whether the wireless channel is occupied to sense energy in transit from the device occupying the wireless channel.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

In some aspects, a method for a wireless device in a wireless network to generate and transmit a universal reservation signal is disclosed. The method includes determining an amount of time a wireless channel is to be occupied by the wireless device for transmitting data. The method further includes generating a universal reservation signal indicating the amount of time. The method also includes transmitting the universal reservation signal to one or more devices in the wireless network before transmitting data on the wireless channel.

For example, the wireless device may determine a channel busy time during which a wireless channel is to be occupied by the wireless device or a second wireless device, generate a universal reservation signal indicating the channel busy time, and transmit the universal reservation signal on the wireless channel to at least one third wireless device.

In some other aspects, a wireless device in a wireless network is disclosed and includes a processor. The wireless device further includes a non-transitory computer-readable storage medium coupled to the processor. The non-transitory computer-readable storage medium may store one or more programs containing instructions that, when executed by the processor of the wireless device, cause the wireless device to determine an amount of time a wireless channel is to be occupied by the wireless device for transmitting data. Execution of the instructions further causes the wireless device to generate a universal reservation signal indicating the amount of time. The wireless device also includes one or more transceivers configured to transmit the universal reservation signal to one or more devices in the wireless network before transmitting data on the wireless channel.

For example, a wireless device may include a processor and a memory. The memory may be a non-transitory computer-readable storage medium coupled to the processor and storing one or more programs containing instructions that, when executed by the processor of the wireless device, cause the wireless device to determine a channel busy time during which a wireless channel is to be occupied by the wireless device or a second wireless device. The instructions also may cause the wireless device to generate a universal reservation signal indicating the channel busy time. The wireless device may also include one or more transceivers configured to transmit on the wireless channel the universal reservation signal to at least one third wireless device.

In some further aspects, example methods for a wireless device in a wireless network to receive and process a universal reservation signal is disclosed. For example, the wireless device may receive on a wireless channel a universal reservation signal from a second wireless device. The universal reservation signal may be configured to indicate a channel busy time during which the wireless channel is to be occupied by the second wireless device or a third wireless device. The wireless device also may refrain from transmitting on the wireless channel during the channel busy time.

In some other aspects, example wireless devices for receiving and processing a universal reservation signal are disclosed. For example, the wireless device may include one or more transceivers configured to receive, on a wireless channel, a universal reservation signal from a second wireless device. The universal reservation signal may be configured to indicate a channel busy time during which the wireless channel is to be occupied by the second wireless device or a third wireless device. The wireless device may also include a processor and a memory. The memory may be a non-transitory computer-readable storage medium coupled to the processor and storing one or more programs containing instructions that, when executed by the processor of the wireless device, cause the wireless device to refrain from transmitting on the wireless channel during the channel busy time.

In some further aspects, a non-transitory computer-readable medium may include instructions, that when executed by a processor of a wireless device, cause the wireless device to determine a channel busy time during which a wireless channel is to be occupied by the wireless device or a second wireless device, generate a universal reservation signal indicating the channel busy time, and transmit the universal reservation signal on the wireless channel to at least one third wireless device.

Another example wireless device for transmitting a universal reservation signal includes means for determining a channel busy time during which a wireless channel is to be occupied by the wireless device or a second wireless device, means for generating a universal reservation signal indicating the channel busy time, and means for transmitting the universal reservation signal on the wireless channel to at least one third wireless device.

In some additional aspects, a non-transitory computer-readable medium may include instructions, that when executed by a processor of a wireless device, cause the wireless device to receive on a wireless channel a universal reservation signal from a second wireless device. The universal reservation signal may be configured to indicate a channel busy time during which the wireless channel is to be occupied by the second wireless device or a third wireless device. The instructions also may cause the wireless device to refrain from transmitting on the wireless channel during the channel busy time.

Another example wireless device for receiving a universal reservation signal includes means for receiving on a wireless channel a universal reservation signal from a second wireless device. The universal reservation signal may be configured to indicate a channel busy time during which the wireless channel is to be occupied by the second wireless device or a third wireless device. The wireless device also may include means for refraining from transmitting on the wireless channel during the channel busy time.

BRIEF DESCRIPTION OF THE DRAWINGS

Aspects of the present disclosure are illustrated by way of example and are not intended to be limited by the figures of the accompanying drawings. Like numbers reference like elements throughout the drawings and specification.

DETAILED DESCRIPTION

Figure 1:
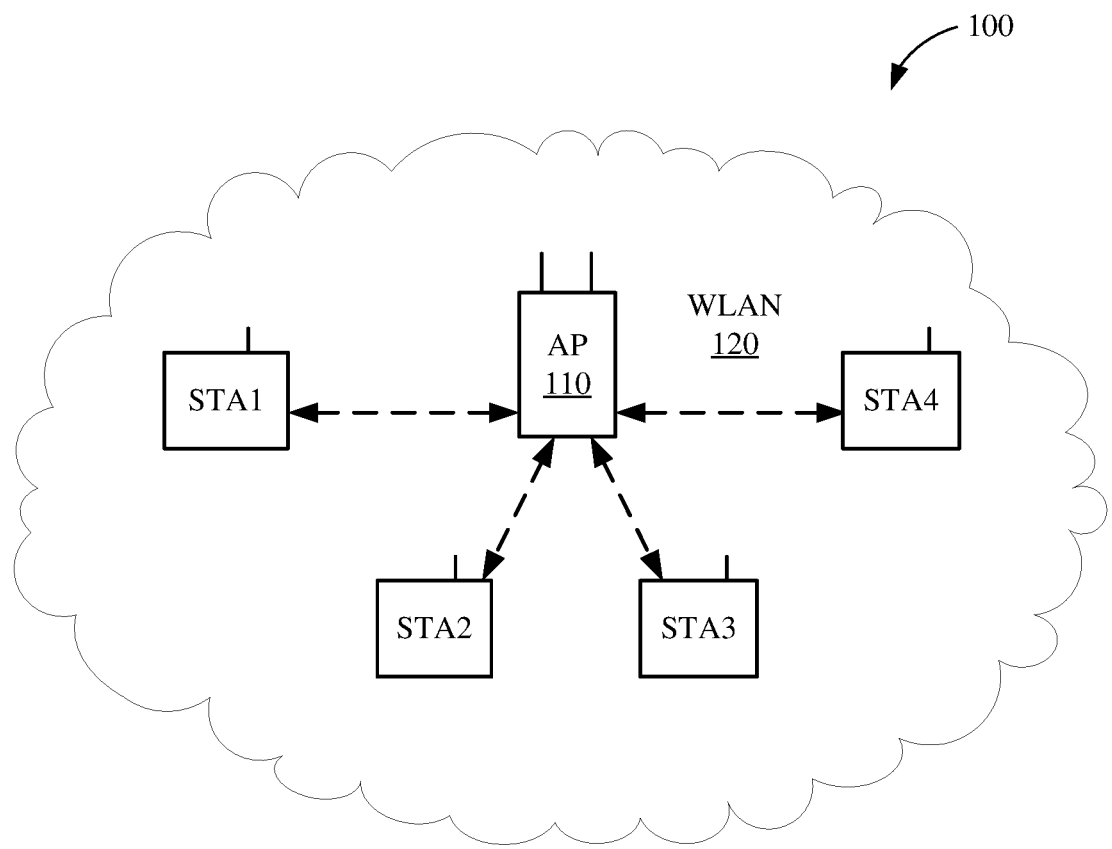
FIG. 1 is an illustration of an example wireless system.

Some aspects of the present disclosure are described below in the context of wireless local area network (WLAN) systems. Although described below in terms of an infrastructure WLAN system including one or more access points (APs) and a number of stations (STAs), the example implementations also are applicable to other WLAN systems (including, for example, multiple WLANs, peer-to-peer systems (e.g., operating according to Wi-Fi Direct protocols), Independent Basic Service Set (IBSS) systems, Wi-Fi Direct systems, and/or Hotspots) and other non-WLAN systems (such as systems including an License Assisted Access (LAA) feature as defined by the 4G Long Term Evolution (LTE) protocol described by the 3rd Generation Partnership Project (3GPP) or other non-WLAN systems). The disclosure should therefore not be limited to implementations including an infrastructure WLAN. Further, although described herein in terms of generating and exchanging frames between wireless devices, the example implementations may be applied to the generation and exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

Various implementations relate generally to the use of an announcement to signal an upcoming channel busy time (CBT). For example, a device (such as an AP or STA in a WLAN, or an LAA-enabled user equipment or base station in a cellular network) may transmit on a wireless channel an announcement of a duration of time that the device will access the wireless channel for transmission (the upcoming CBT). The announcement may be a vendor specific or standardized packet transmitted (for example, broadcast) to other devices before the channel is occupied by the transmitting device. In some example implementations, the upcoming CBT is announced in a Universal Reservation Signal (URS), as described below. An announcement (such as a URS) to the devices of the wireless network of the upcoming CBT may increase the efficiency in utilizing the wireless medium (for example, because time is not spent listening to a channel and determining when the channel is available) and increase the efficiency in power use by allowing other devices to enter a low power state for at least a portion of the CBT. Announcing the upcoming CBT also removes error that may otherwise result if a wireless device is required to infer when a wireless channel is available through sensing mechanisms. Announcing the upcoming CBT also enables the receiving device to have knowledge of the CBT closer to when the transmitting device occupies the wireless channel. Additionally, because the CBT is transmitted as part of an encoded structure (such as a URS), the encoded structure (such as the URS) can be reliably received at lower receive power levels than a typical energy detect threshold. For example, the encoded structure may be reliably received at a power level as low as −82 dBm for a 20 MHz channel, while the energy detect level may be −62 dBm for the 20 MHz channel. In some example implementations, if the encoded structure to indicate the CBT is received at an energy detect threshold of −82 dBm for a 20 MHz channel, the energy detect threshold may be reduced from an initial −72 dBm or −62 dBm. Otherwise, the energy detect threshold may remain at the initial −72 dBm or −62 dBm. The encoded structure/URS may be included in a packet. For example, the URS may be included in the preamble of a packet. In some example implementations, lowering the energy detect threshold may be for the body of the packet after receiving the preamble.

In the following description, numerous specific details are set forth such as examples of specific components, circuits, and processes to provide a thorough understanding of the present disclosure. The term "coupled" as used herein means connected directly to or connected through one or more intervening components or circuits. In the following description and for purposes of explanation, specific nomenclature is set forth to provide a thorough understanding of the example implementations. However, it will be apparent persons having ordinary skill in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. These descriptions and representations are the means used by persons having ordinary skill in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in various ways for each particular application, but such implementation decisions should not be interpreted as causing a departure from the scope of the present invention. Also, the example wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components also may be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described herein may be executed by one or more processors, such as one or more digital signal processors (DSPs), general purpose microprocessors, baseband processors, application specific integrated circuits (ASICs), application specific instruction set processors (ASIPs), field programmable gate arrays (FPGAs), or other equivalent integrated or discrete logic circuitry. The term "processor," as used herein, may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any suitable processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration.

FIG. 1 is a block diagram of a wireless system 100 within which aspects of the present disclosure may be implemented. The wireless system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. For some example implementations, the wireless system 100 may correspond to a multiple-input multiple-output (MIMO) wireless network. Further, although the WLAN 120 is depicted in FIG. 1 as an infrastructure BSS, for other aspects, WLAN 120 may be an independent BSS (IBSS), an ad-hoc network, or a peer-to-peer (P2P) network (e.g., operating according to the Wi-Fi Direct protocols).

Each of stations STA1-STA4 may be any suitable Wi-Fi enabled wireless device (or other suitable wireless device) including, for example, a cell phone, personal digital assistant (PDA), tablet device, laptop computer, or the like. Each station (STA) also may be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each station STA may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 7 and 9.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that may store instructions for performing operations described below.

For the stations STA1-STA4 and/or AP 110, the one or more transceivers may include Wi-Fi transceivers, LAA transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within at least a 5 GHz frequency band in accordance with the IEEE 802.11 specification. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within the STA may be any technically feasible transceiver such as a ZigBee transceiver, a WiGig transceiver, and/or a HomePlug transceiver.

Figure 2:
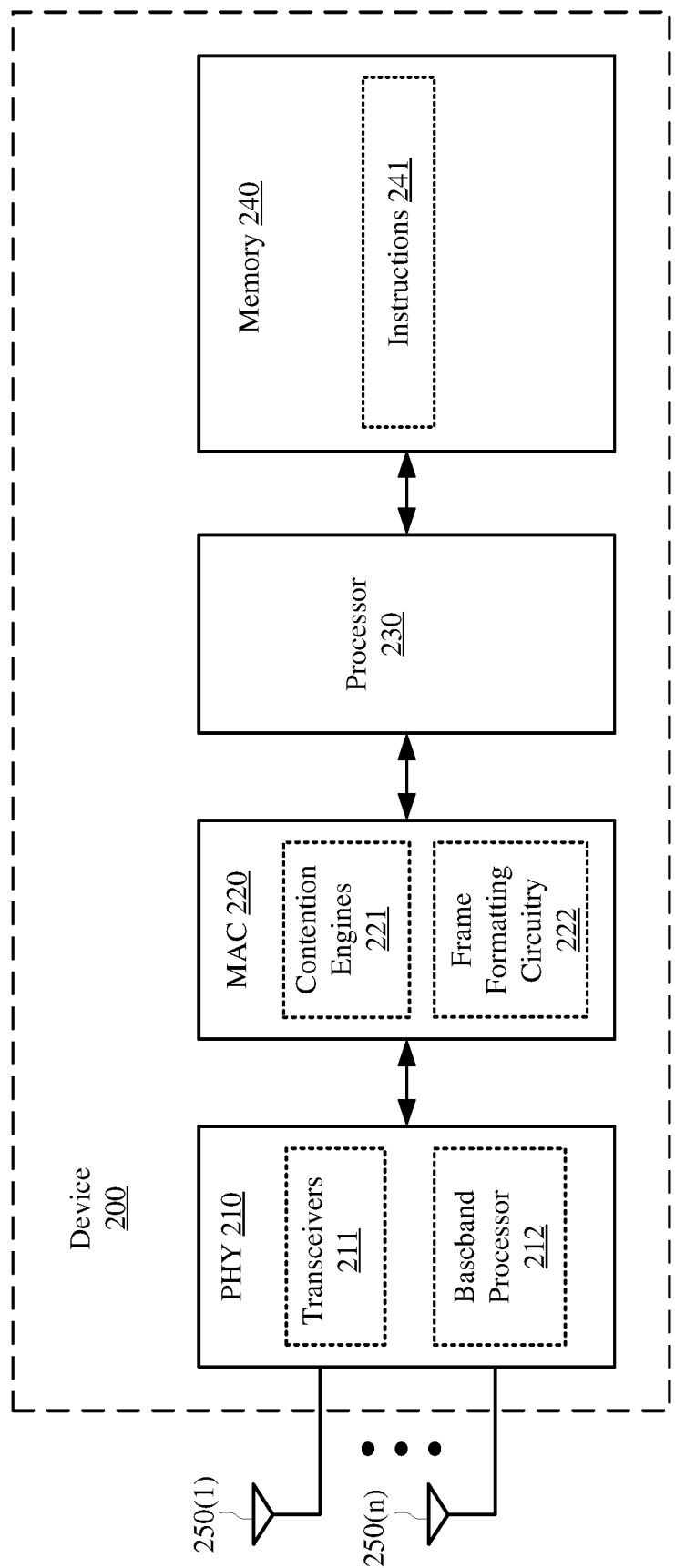
FIG. 2 is an illustration of an example wireless device.

FIG. 2 is an illustration of an example wireless device 200 for performing at least some of the aspects of the present disclosure. Wireless device 200 may be an example of a STA (such as STA1-STA4) or an example of AP 110 from FIG. 1. The wireless device 200 may include a PHY device 210 including at least a number of transceivers 211 and a baseband processor 212, may include a MAC 220 including at least a number of contention engines 221 and frame formatting circuitry 222, may include a processor 230, may include a memory 240, and may include a number of antennas 250(1)-250(n). The transceivers 211 may be coupled to antennas 250(1)-250(n), either directly or through an antenna selection circuit (not shown for simplicity). The transceivers 211 may be used to transmit signals to and receive signals from AP 110 and/or other STAs (see also FIG. 1), and may be used to scan the surrounding environment to detect and identify nearby access points and/or other STAs (e.g., within wireless range of wireless device 200). Although not shown in FIG. 2 for simplicity, the transceivers 211 may include any number of transmit chains to process and transmit signals to other wireless devices via antennas 250(1)-250(n), and may include any number of receive chains to process signals received from antennas 250(1)-250(n). Thus, for some aspects, the wireless device 200 may be configured for MIMO operations. The MIMO operations may include single-user MIMO (SU-MIMO) operations and multi-user MIMO (MU-MIMO) operations.

The baseband processor 212 may be used to process signals received from processor 230 and/or memory 240, and to forward the processed signals to transceivers 211 for transmission via one or more of antennas 250(1)-250(n). The baseband processor 212 also may be used to process signals received from one or more of antennas 250(1)-250(n) via transceivers 211, and to forward the processed signals to processor 230 and/or memory 240.

For purposes of discussion herein, MAC 220 is shown in FIG. 2 as being coupled between PHY device 210 and processor 230. In some implementations, PHY device 210, MAC 220, processor 230, and/or memory 240 may be connected together using one or more buses (not shown for simplicity).

The contention engines 221 may contend for access to one more shared wireless mediums, and also may store packets for transmission over the one or more shared wireless mediums. The wireless device 200 may include one or more contention engines 221 for each of a plurality of different access categories for traffic.

The frame formatting circuitry 222 may be used to create and/or format frames received from processor 230 and/or memory 240 (e.g., by adding MAC headers to protocol data units (PDUs) provided by processor 230), and may be used to re-format frames received from PHY device 210 (e.g., by stripping MAC headers from frames received from PHY device 210).

Memory 240 may include a non-transitory computer-readable medium (e.g., one or more nonvolatile memory elements, such as EPROM, EEPROM, Flash memory, a hard drive, and so on) that may store instructions 241 that, when executed by processor 230, cause wireless device 200 to perform functions in implementing at least some aspects of the present disclosure. The non-transitory computer-readable medium of memory 240 thus may include instructions 241 for performing all or a portion of the operations depicted in FIGS. 4 and 5. Processor 230 may be any suitable one or more processors capable of executing scripts or instructions of one or more software programs stored in wireless device 200 (such as instructions 241 within memory 240). Alternatively, the instructions 241 may be included in another memory and executed by another component other than the processor 230.

The device 200 may be configured to generate and transmit a URS to other devices in the wireless network to indicate the upcoming CBT. Additionally, the device 200 may be configured to receive and process a URS from another device in the wireless network. The URS may be a vendor-specific or standard frame used to indicate the CBT, and the URS may be included in a vendor-specific or standard packet. For example, the URS may be included in the preamble of a packet. The CBT may begin at the end of the packet preamble (such as when the device finishes receiving the preamble including the URS). Alternatively, the CBT may begin at the beginning of the packet, during the preamble, at the end of the packet, or another suitable point.

Figure 3A:
FIG. 3A is an illustration of an example frame format of a universal reservation signal (URS) to indicate an upcoming channel busy time (CBT).

FIG. 3A is an illustration of an example frame format of a URS 300 to indicate an upcoming CBT. The URS 300 includes a Training Field 302 and an Information Field 304. The Training Field 302 may indicate the beginning of the frame, and may include a sequence of bits to be used by other wireless devices to synchronize timers or clocks in order to properly receive the frame. The Information Field 304 may include an indication of the upcoming CBT. In some example implementations, one URS frame is for a 20 MHz channel in the 5 GHz frequency band. In other example implementations, a URS frame may be used for any size channel (such as 2 MHz, 5 MHz, 40 MHz, 80 MHz, and so on) or for frequency bands other than the 5 GHz frequency band, such as the 2.4 GHz, 5.8 GHz, 6 GHz, or 60 GHz bands.

Figure 3B:
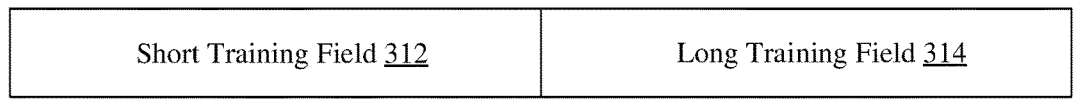
FIG. 3B is an illustration of an example Training Field in the URS in FIG. 3A.

FIG. 3B is an illustration of an example Training Field 302 in the URS 300 in FIG. 3A. The Training Field 302 may include a Short Training Field (STF) 312 and a Long Training Field (LTF) 314. The Short Training Field 312 may include a plurality of Short Training Symbols. The Long Training Field 314 may include one or more Long Training Symbols. The Long Training Field 314 also may include a guard interval separating the Short Training Symbols of the Short Training Field 312 from the one or more Long Training Symbols of the Long Training Field 314. The contents of the Short Training Field 312 and the Long Training Field 314 are described below regarding FIG. 3C and FIG. 3D, respectively.

Figure 3C:
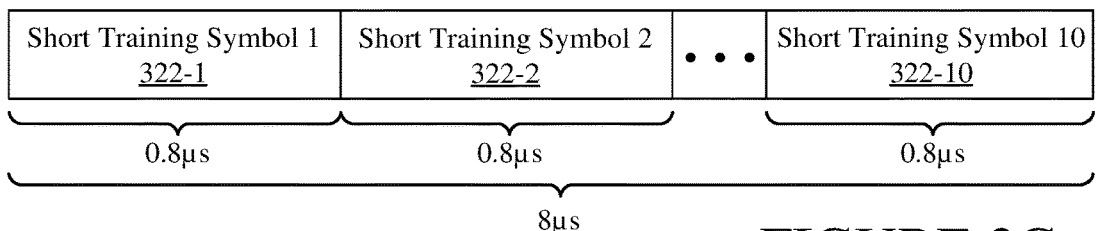
FIG. 3C is an illustration of an example Short Training Field in the Training Field in FIG. 3B.

FIG. 3C is an illustration of an example Short Training Field 312 in FIG. 3B. The Short Training Field 312 may include ten Short Training Symbols (including Short Training Symbol 1 322-1, Short Training Symbol 2 322-2, through Short Training Symbol 10 322-10). While ten Short Training Symbols are illustrated in the example, other embodiments of the URS may include any number of Short Training Symbols. Also, while the indicated amount of time for the Short Training Field 312 is 8 µs (with each Short Training Symbol taking 0.8 µs), the Short Training Field 312 may be any suitable length.

In some example implementations, each Short Training Symbol may consist of 12 subcarriers and be modulated by $M_{-6,6}=\{1, -1, 1, -1, -1, 1, 0, -1, -1, 1, 1, 1, 1\}$. In some example implementations, the ten Short Training Symbols 322-1 through 322-10 of the Short Training Field 312 may be generated by a wireless device (such as device 200 in FIG. 2) in accordance with Equation (1) below:

$$r_{short}(t) = (1+j)\sqrt{\frac{13}{6}} \times \Sigma_i \ M_i \exp(2\pi ij(\Delta f_{short}(t))) \quad (1)$$

where $\Delta f_{short}$=1.25 MHz and t is between 0 and 8 µs. While an example for generating the Short Training Field 312 is provided, any suitable means may be used for generating the Short Training Field.

Figure 3D:
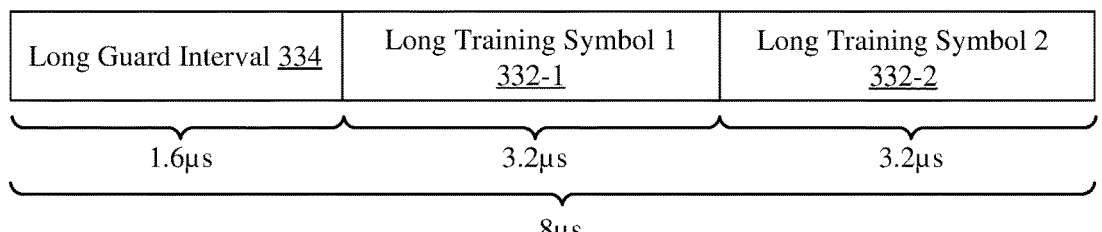
FIG. 3D is an illustration of an example Long Training Field in the Training Field in FIG. 3B.

FIG. 3D is an illustration of an example Long Training Field 314 in FIG. 3B. The Long Training Field 314 may include two Long Training Symbols (Long Training Symbol 1 332-1 and Long Training Symbol 2 332-2). The Long Training Field 314 also may include a Long Guard Interval 334 to separate the Short Training Symbols of the Short Training Field 312 and the Long Training Symbols of the Long Training Field 314. While two Long Training Symbols are illustrated in the example, other embodiments of the URS may include any number of Long Training Symbols. Also, while the indicated amount of time for the Long Training Field 314 is 8 µs (with each Long Training Symbol taking 3.2 µs and the Long Guard Interval taking 1.40, the Long Training Field 314 may be any suitable length.

In some example implementations, each Long Training Symbol may consist of 52 subcarriers and be modulated by $N-26, 26=\{1, 1, -1, -1, 1, 1, -1, 1, -1, 1, 1, 1, 1, 1, 1, -1, -1, 1, 1, -1, 1, -1, 1, 1, 1, 1, 0, 1, -1, -1, 1, 1, -1, 1, -1, 1, -1, -1, -1, -1, -1, 1, 1, -1, -1, 1, -1, 1, -1, 1, 1, 1, 1\}$. In some example implementations, the two Long Training Symbols 332-1 332-2 of the Long Training Field 314 may be generated by a wireless device (such as device 200 in FIG. 2) in accordance with Equation (2) below:

$$r_{long}(t) = \Sigma_i N_i \exp(2\pi ij(\Delta f_{long}(t-1.6 \ \mu s))) \quad (2)$$

where $\Delta f_{long}$=0.3125 MHz, t is between 0 and 8 µs, and 1.6 µs is the length of the Long Guard Interval 334. While an example for generating the Long Training Field 314 is provided, any suitable means may be used for generating the Long Training Field.

In concatenating the Short Training Field 312 with the Long Training Field 314 in generating the Training Field 302, the value of a training symbol at any point in time along the Training Field 302 may be defined in accordance with Equation (3) below:

$$r_{Training \ Field}(t) = r_{short}(t) r_{long}(t-8 \ \mu s) \quad (3)$$

where t is between 0 µs and 16 µs, $r_{short}(t)$=0 when t is greater than 8 µs, and $r_{long}(t-8 \ \mu S)$=0 when t is less than 8 µs.

Figure 3E:
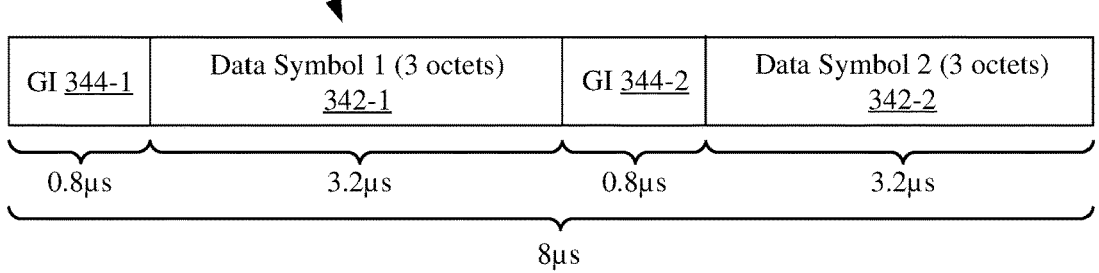
FIG. 3E is an illustration of an example Information Field in the URS in FIG. 3A.

FIG. 3E is an illustration of an example Information Field 304 in FIG. 3A. The Information Field 304 indicates the amount or length of time the device is to occupy the wireless channel after transmission of the URS. The Information Field 304 may include two data symbols (Data Symbol 1 342-1 and Data Symbol 2 342-2). The Information Field 304 also may include a Guard Interval (such as Guard Interval 344-1 and Guard Interval 344-2) preceding each data symbol to separate the data symbol from other symbols. The Information Field 304 may be 8 μs, where each guard interval 344-1 and 344-2 may be 0.8 μs and each data symbol 342-1 and 342-2 may be 3.2 μs. Each data symbol 342-1 and 342-2 may be three octets (24 bits) which may indicate the length of an upcoming CBT of up to 5.46 ms (in increments of 4 μs). In some example implementations, Data Symbol 1 342-1 exclusively indicates the length of the CBT, and Data Symbol 2 342-2 may be ignored by a device receiving the CBT. The CBT may begin after Data Symbol 2 342-2. While an example length of the Information Field, guard intervals and data symbols are provided, Information Field 304 and its contents may be of any length. Additionally, while a length limit of 5.46 ms for the CBT and increments of 4 μs are described, the Information Field 304 may indicate any other suitable CBT length limit other than 5.46 ms and may use any other size increments (such as 2 μs, 8 μs, and so on). In some other example implementations, the URS 300 may indicate the length or duration of the CBT in terms of number or increment of symbols, bits, or bytes on the wireless channel, or another suitable unit of measure for the CBT.

Figure 3F:
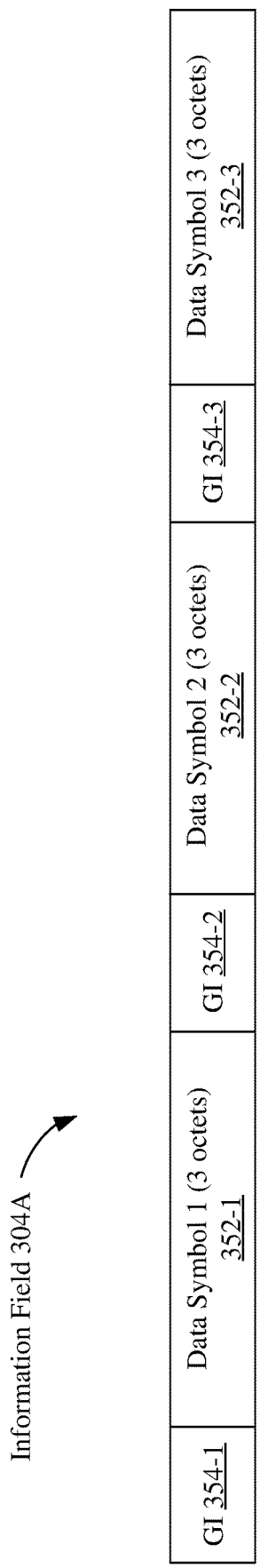
FIG. 3F is an illustration of another example Information Field in the URS in FIG. 3A.

In some other example implementations, the Information Field 304 may include a third data symbol. FIG. 3F is an illustration of another example Information Field (304A) in the URS 300 in FIG. 3A. The Information Field 304A includes Data Symbol 1 352-1, Data Symbol 2 352-2, and Data Symbol 3 352-3 separated by Guard Intervals 354-1, 354-2, and 354-3. An alternative format for URS 300 includes Information Field 304A (FIG. 3F) instead of Information Field 304 (FIG. 3E). Any of Data Symbol 1 352-1 through Data Symbol 3 352-3, or any combination of the data symbols, may indicate the length of the CBT, and the CBT may begin after Data Symbol 3 352-3. Data Symbol 3 352-3 of Information Field 304A may be 3 data octets (24 data bits). In some example implementations, Data Symbol 3 352-3 may be generated using Quadrature Binary Phase-Shift Keying (QBPSK) modulation.

Figure 3G:
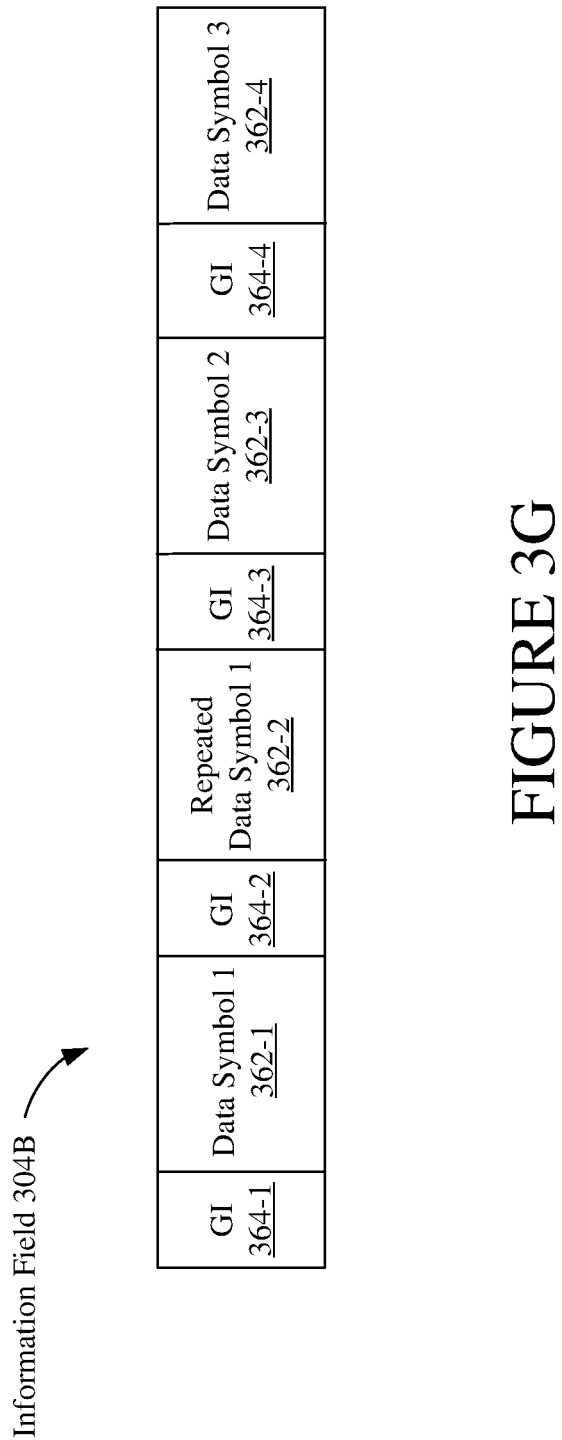
FIG. 3G is an illustration of another example Information Field in the URS in FIG. 3A.

In some other example implementations, the Information Field 304A may include a repeated first data symbol (Data Symbol 1 352-1). FIG. 3G is an illustration of another example Information Field (304B) in the URS 300 in FIG. 3A. The Information Field 304B includes Data Symbol 1 362-1, repeated Data Symbol 1 362-2, Data Symbol 2 362-3, and Data Symbol 3 362-4 separated by Guard Intervals 364-1, 364-2, 364-3, and 364-4. In one example, Data Symbol 1 362-1 and repeated Data Symbol 1 362-2 may be the same as Data Symbol 1 352-1 in Information Field 304A, Data Symbol 2 362-3 may be the same as Data Symbol 2 352-2 in Information Field 304A, and Data Symbol 3 362-4 may be the same as Data Symbol 3 352-3 in Information Field 304A. In another example, Data Symbol 2 362-2 and Data Symbol 3 362-3 may each be 26 bits. An alternative format for URS 300 includes Information Field 304B (FIG. 3G) instead of Information Field 304 (FIG. 3E) or Information Field 304A (FIG. 3F). Data Symbol 1 362-1 may indicate the length of the CBT (with repeated Data Symbol 1 362-2 being the same value as Data Symbol 1 362-1), and the CBT may begin after Data Symbol 3 362-4. In some example implementations, Data Symbol 2 362-3 and Data Symbol 3 362-4 of Information Field 304B each contain 26 bits.

Figure 4:
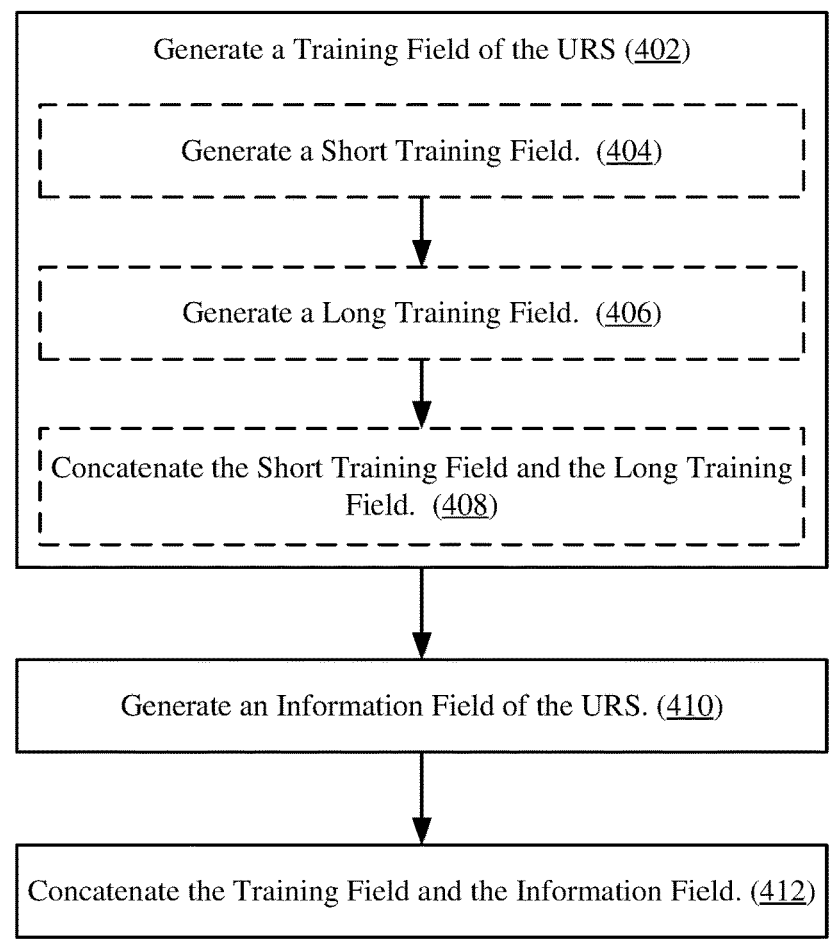
FIG. 4 is an illustrative flowchart depicting an example operation for generating a URS.

FIG. 4 is an illustrative flowchart depicting an example operation 400 for a wireless device to generate a URS frame to be transmitted to one or more devices in the wireless network. FIG. 4 is described below in relation to the example URS 300 and portions of the URS 300 in FIG. 3A through FIG. 3G.

Beginning at 402, the device (such as device 200 in FIG. 2) may generate a Training Field 302 of a URS 300. In some example implementations, the device may generate a Short Training Field 312 (404), generate a Long Training Field 314 (406), and concatenate the Short Training Field 312 and the Long Training Field 314 (408) to generate the Training Field 302. In generating the Short Training Field 312 (404), the device may generate the field in accordance with equation (1) above. In generating the Long Training Field 314 (406), the device may include a guard interval to precede the long training symbols of the Long Training Field 314 and generate the field in accordance with equation (2) above. In concatenating the Short Training Field 312 and the Long Training Field 314 (406), the value of the Training Field 302 at any point in time along the field may be expressed by equation (3) above.

The device also generates an Information Field 304 (410), and the device may concatenate the Training Field 302 and the Information Field 304 to create the URS frame (412). The device may additionally or alternatively generate Information Field 304A (FIG. 3F), Information Field 304B (FIG. 3G), or other format Information Field, and the device may concatenate the Training Field 302 and the Information Field 304A or 304B (or other format Information Field) to create the URS frame.

In some example implementations of device 200 in FIG. 2 generating a URS frame, the frame formatting circuitry 222 in MAC 220 may generate the bits to be represented in the data symbols 342-1 and 342-2 of the Information Field 304 indicating the CBT (or data symbols 352-1 through 352-3 of the Information Field 304A, data symbols 362-1 through 362-4 of the Information Field 304B, data symbols of a different format Information Field, and so on), and provide the generated bits to the PHY 210. The baseband processor 212 in PHY 210 may generate the Training Field 302, generate the Information Field 304 (or Information Field 304A, Information Field 304B, other format Information Field, and so on) by processing the received bits, and provide the generated URS frame to one or more transceivers 211 for transmission.

Figure 5:
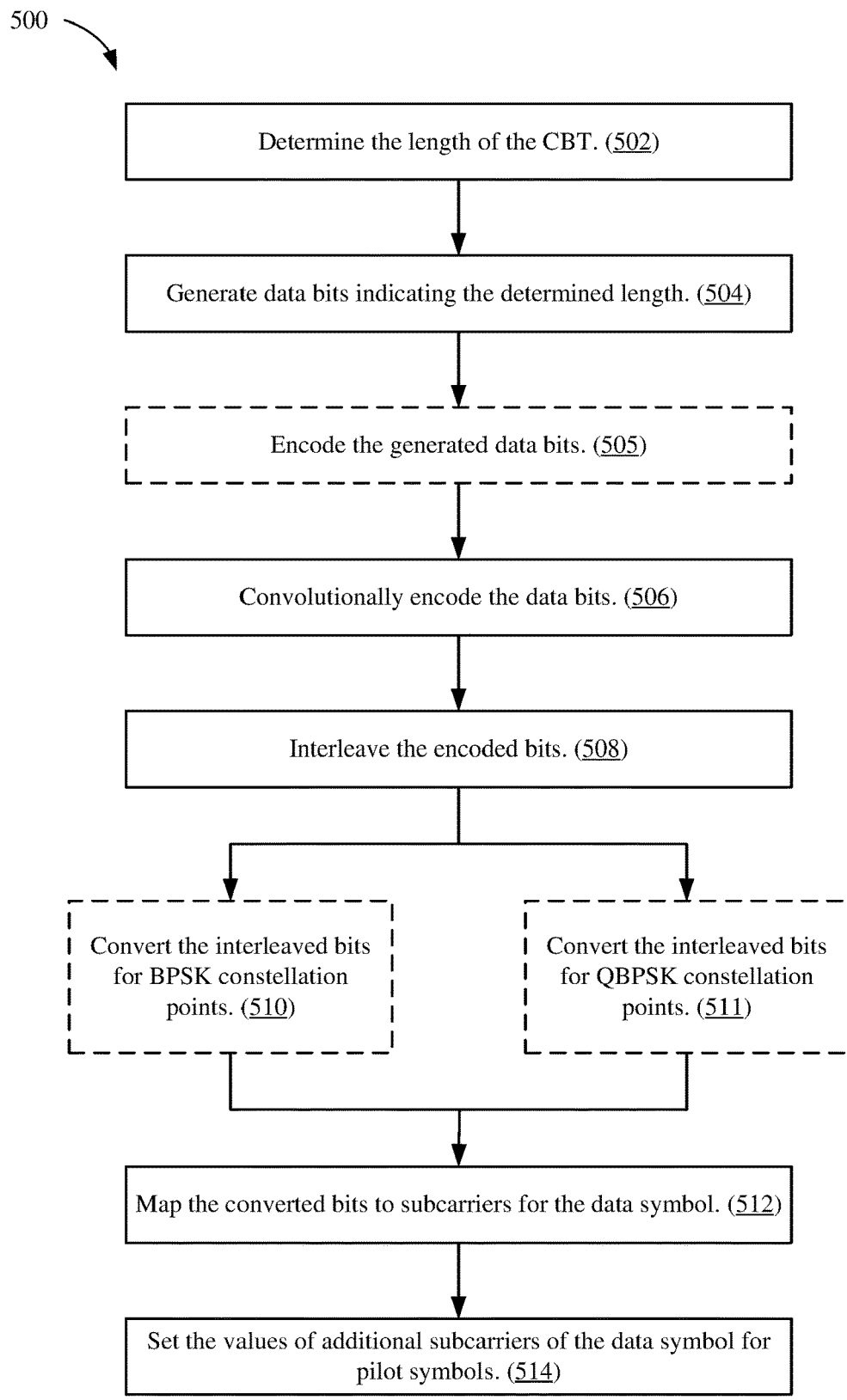
FIG. 5 is an illustrative flowchart depicting an example operation for generating data symbols of an Information Field of a URS.

FIG. 5 is an illustrative flowchart depicting an example operation 500 for a wireless device to generate a data symbol of an Information Field of a URS frame. FIG. 5 is described below in relation to the example Information Field 304 in FIG. 3E, the example Information Field 304A in FIG. 3F, and the example Information Field 304B in FIG. 3G. However, other format Information Fields may be generated using the example operation 500, and aspects of the disclosure should not be limited to the provided examples. Beginning at 502, the device determines the length of the CBT to be announced in the URS. For example, the device may determine that its data transmission after the URS will take an amount of time up to 5.46 ms (in 4 μs increments). Proceeding to 504, the device generates the data bits to indicate the determined length. For example, the device may generate 24 data bits for Information Field 304, Information Field 304A, or Information Field 304B (with Data Symbol 1 362-1 and repeated Data Symbol 1 362-2 being the same) to indicate the determined length. In some other example implementations, the device may determine the length or duration of the CBT in terms of number or increment of symbols, bits, or bytes on the wireless channel, or another suitable unit of measure.

In some example implementations, the device may optionally encode at least a portion of the generated data bits (505). In one example, the device encodes Data Symbol 1 342-1 for Information Field 304. In another example, the device encodes one or more of Data Symbol 1 352-1, Data Symbol 2 352-2, and Data Symbol 3 352-3 for Information Field 304A. In a further example, the device may encode Data Symbol 1 362-1 for Information Field 304B, with the data symbol to be repeated after encoding. Alternatively, the device may repeat Data Symbol 1 362-1 and then encode Data Symbol 1 362-1 and repeated Data Symbol 1 362-2. One example generator polynomial for encoding one or more data symbols is illustrated in equation (4) below:

$$S(x)=x^7+x^4+1 \qquad (4)$$

where the initial value may be non-zero and random.

The device may then encode the data bits (or encode the encoded bits if encoding the data bits in step 505) using a convolutional encoder (506). In some example implementations, the convolutional encoder may encode at a rate of ½ (to generate 48 convolved bits from 24 bits for Information Field 304). The convolutional encoder also may use generator polynomials $g_0=133_8$ and $g_1=171_8$. However, the convolutional encoder may use any suitable generator polynomial.

The device may then interleave the encoded bits (508). In some example implementations, the device may interleave the 48 encoded bits for Information Field 304 in accordance with Mapping Equation (5) below:

$$j = 3 \times \mathrm{mod}_{16}(k) + \mathrm{floor}\left(\frac{k}{16}\right) \qquad (5)$$

where j is the bit location (in the interleaved sequence including the 48 encoded bits) of bit location k (in the original sequence of the 48 encoded bits and where k is an integer from 0 to 47). For example, the first encoded bit (k=0) in the sequence corresponds to bit location 0 (the first bit) in the interleaved sequence of bits (j=3×0+0=0); the second encoded bit (k=1) in the sequence corresponds to bit location 3 in the interleaved sequence of bits (j=3×1+0=3); the tenth encoded bit (k=9) in the sequence corresponds to bit location 27 in the interleaved sequence of bits (j=3×9+0=27); the seventeenth encoded bit (k=16) in the sequence corresponds to bit location 1 (the second bit) in the interleaved sequence of bits (j=3×0+1=1); the eighteenth encoded bit (k=19) in the sequence corresponds to bit location 4 in the interleaved sequence of bits (j=3×1+1=4); the twenty-sixth encoded bit (k=25) in the sequence corresponds to bit location 28 in the interleaved sequence of bits (j=3×9+1=28); and so on.

In some example implementations after interleaving the encoded bits, the device may optionally convert the interleaved bits for Binary Phase-Shift Keying (BPSK) constellation points (510). In one example, each data symbol of a URS may convey 48 bits. In converting the interleaved bits, the device may convert bit values of 0 to −1 and maintain bit values of 1 as 1. In this manner, a BPSK constellation point may be represented by the converted value of a corresponding interleaved bit, which is either 1 or −1, and the sequence of converted bits may correspond to an equal number of subcarriers. For example, 48 converted bits may correspond to 48 subcarriers. In one example, Data Symbol 1 342-1 and Data Symbol 2 342-2 of Information Field 304 may be converted for BPSK constellation points. In another example, Data Symbol 1 362-1, repeated Data Symbol 1 362-2, Data Symbol 2 362-3, and Data Symbol 3 362-4 of Information Field 304B may all be converted for BPSK constellation points.

In some other examples after interleaving the encoded bits, the device may optionally convert the interleaved bits for Quadrature BPSK (QBPSK or QPSK) constellation points (511). In one example, the device converts the interleaved bits of Data Symbol 1 352-1, Data Symbol 2 352-2, and Data Symbol 3 352-3 for QBPSK constellation points. In converting the interleaved bits, the device may convert bit values of 0 to −i and convert bit values of 1 to i. In this manner, a QBPSK constellation point may be represented by the converted value of a corresponding interleaved bit (either i or −i), and the sequence of converted bits may correspond to an equal number of subcarriers. For example, 48 converted bits may correspond to 48 subcarriers.

The device may map the converted bits to subcarriers of the data symbol (512). In some example implementations for mapping the converted bits, the contents of the data symbol (DS) is generated in accordance with Equation (6) below:

$$r_{DS}(t)=\Sigma_i N_i \exp(2\pi j D_i(\Delta f_{long}(t-0.8 \text{ μs}))) \qquad (6)$$

where t is between 0 and 4 μs, and $\Delta f_{long}$=0.3125 MHz.

The subcarriers for the data symbol also may include subcarriers for pilot symbols. In some example implementations, the 48 converted bits may be mapped to subcarriers −26 to 26 of a data symbol ($D_{-26,26}$), with no energy to be transmitted on subcarrier 0. In the example of 48 converted bits being mapped to a data symbol of 52 subcarriers (excluding subcarrier 0), there may be 4 subcarriers for transmitting pilot symbols. The device may set the values of the additional subcarriers for transmitting pilot symbols (514). In some example implementations, the subcarriers for the pilot symbols may be subcarriers −21, −7, 7, and 21 (to which the converted symbols are not mapped). In one example, the values of the subcarriers −21, −7, 7, and 21 are BPSK modulated values 1, 1, 1, and −1, respectively.

The Information Field may include more than four data symbols (such as seven data symbols). In some example implementations, the values of the subcarriers −21, −7, 7, and 21 are BPSK modulated values 1, 1, 1, and −1, respectively, for the first four data symbols. For data symbols after the fourth data symbol in the Information Field (such as data symbols 5 through 7 in a 7 data symbol format Information Field), the values of the subcarriers −21, −7, 7, and 21 may be BPSK modulated values −1, −1, −1, and 1, respectively.

In some example implementations, Data Symbol 2 342-2 of Information Field 304 is not used to indicate the length of the CBT, and the device receiving the URS 300 with Information Field 304 may ignore Data Symbol 2 342-2. Additionally, the device generating the URS 300 with Information Field 304 may generate the data bits for Data Symbol 2 342-2 in any manner. For example, the device may include zero padding for the entire data symbol, set all of the subcarriers of the data symbol (other than the subcarriers reserved for pilot symbols) to 1, include random data bit values, use the same data bit pattern for each URS, and so on.

In some additional or alternative example implementations, Data Symbol 3 352-3 of Information Field 304A or Data Symbol 3 362-4 of Information Field 304B is not used to indicate the length of the CBT. In one example, the device receiving the URS 300 with Information Field 304A may ignore Data Symbol 3 352-3. In another example, the device receiving the URS 300 with Information Field 304B may ignore Data Symbol 3 362-4. Additionally, the device generating the URS 300 with Information Field 304A or Information Field 304B may generate the data bits for Data Symbol 3 352-3 or Data Symbol 3 362-4 in any manner. For example, the device may include zero padding for the entire data symbol, set all of the subcarriers of the data symbol (other than the subcarriers reserved for pilot symbols) to 1, include random data bit values, use the same data bit pattern for each URS, and so on.

In some example implementations, Data Symbol 3 352-3 in Information Field 304A or Data Symbol 3 362-4 in Information Field 304B may include a value that is not equal to a Cyclic Redundancy Check (CRC) value for at least a portion of one or more data symbols in the Information Field. In one example, the CRC is an 8-bit CRC (CRC8) across the 24 bit values (the 3 data octets) of Data Symbol 2 352-2 through or concatenated with the first ten bit values of Data Symbol 3 352-3. In another example, the CRC is a CRC8 across the 24 bit values of Data Symbol 2 362-3 through or concatenated with the first ten bit values of Data Symbol 3 362-4 (if, for example, the data symbols are each 3 data octets). An example Data Symbol 2 352-2 for Information Field 304A (or Data Symbol 2 362-3 for Information Field 304B) and an example Data Symbol 3 352-3 for Information Field 304A (or Data Symbol 3 362-4 for Information Field 304B) are illustrated below:

pppp pppp pppp pppp pppp pppp | pppp pppp pppp ppyy yy00 0000

Data Symbol 2 | Data Symbol 3 where p may be 0 or 1,
yy yyyy yy ≠ CRC8 value across [pppp pppp pppp pppp pppp pppp pppp pppp pp], and 00 0000 is zero padding.

One example generator polynomial for generating the CRC8 value is illustrated in equation (7) below:

$$S(x) = x^8 + x^2 + x + 1 \qquad (7)$$

Generating yy yyyy yy may be performed by any means, such as adding or subtracting a random value to the CRC8 value, choosing a fixed value if not equal to the CRC8 value, and so on.

In some example implementations, Data Symbol 2 362-3 and Data Symbol 3 362-4 of Information Field 304B each contain 26 bits, and an example Data Symbol 2 362-3 and an Data Symbol 3 362-4 are illustrated below:

pppp pppp pppp pppp pppp pppp pp | pp pppp pppp pppp ppyy yy00 0000

Data Symbol 2 | Data Symbol 3 where p may be 0 or 1,
yy yy ≠ bits 4-7 of a CRC8 value across [pppp pppp pppp pppp pppp pp pp pppp pppp pp],
and 00 0000 is zero padding.

In some other example implementations, yy yy may be any of the bits of the CRC8 value, and/or the CRC may be performed across different bits of the data symbols. Additionally or alternatively, the any values may be used in place of zero padding, such as random values, all ones, a specific pattern of bit values, and so on.

If 24 data bits are to indicate the length of a CBT up to 5.46 ms (in 4 μs increments) and the CBT is a non-zero length, 17 of the 24 bits may be used to indicate the length of the CBT. In some example implementations, 1 bit may be a parity bit and 6 bits that may be zero padding at the end of the 24 data bits. A bitmap of the above example of a Data Symbol 1 342-1 (with the bits of the bitmap displayed in transmit order from left to right, least significant bit (LSB) to most significant bit (MSB)) is illustrated below:

xxxx xxxx xxxx xxxx xp00 0000 where bits xxxx xxxx xxxx xxxx x indicate the number of 4 μs increments for the CBT, bit p represents a parity bit, and bits 00 0000 are 6 zero padded bits at the end of the Data Symbol 1 342-1.

In some example implementations, when the bits indicating the number of increments are 1101 0xxx xxxx xxxx x (such as in the example bitmap 1101 0xxx xxxx xxxx xp00 0000), the length of the CBT is indicated in bits xxx xxxx xxxx x (a "length" field). The length field may indicate a number that falls in an interval of [a−2, a], with the value of a in accordance with Equation (8) below:

$$a = 3 \times \frac{CBT}{4} \qquad (8)$$

where the value of the CBT is greater than 0 and indicates the length of the CBT in increments of 4 μs. In this manner, the receiving device may determine the length or duration of the CBT from the length field (bits xxx xxxx xxxx x), in accordance with Equation (9) below:

$$CBT = 4 \times \text{ceiling}\left(\frac{\text{length field}}{3}\right) \qquad (9)$$

The ceiling function (or round up function) outputs the next integer higher than the number (if not a whole number). Also, the parity bit p may indicate an even parity of the preceding data bits 1101 0xxx xxxx xxxx x.

In some example implementations, the URS 300 (which may be the concatenated (i) Training Field including the Short Training Field and the Long Training Field and (ii) Information Field including Data Symbol 1 (DS1) and Data Symbol 2 (DS2)) may be represented by Equation (10) below:

$$r_{URS}(t) = r_{short}(t) + r_{long}(t-8 \text{ μs}) + r_{DS1}(t-16 \text{ μs}) + r_{DS2}(t-20 \text{ μs}) \qquad (10)$$

where t is between 0 μs and 24 μs, $r_{short}(t)=0$ when t is greater than 8 μs, $r_{long}(t-8 \text{ μs})=0$ when t is less than 8 μs or greater than 16 μs, $r_{DS1}(t-16 \text{ μs})=0$ when t is less than 16 μs or greater than 20 μs, and $r_{long}(t-20 \text{ μs})=0$ when t is less than 20 μs.

Figure 6:
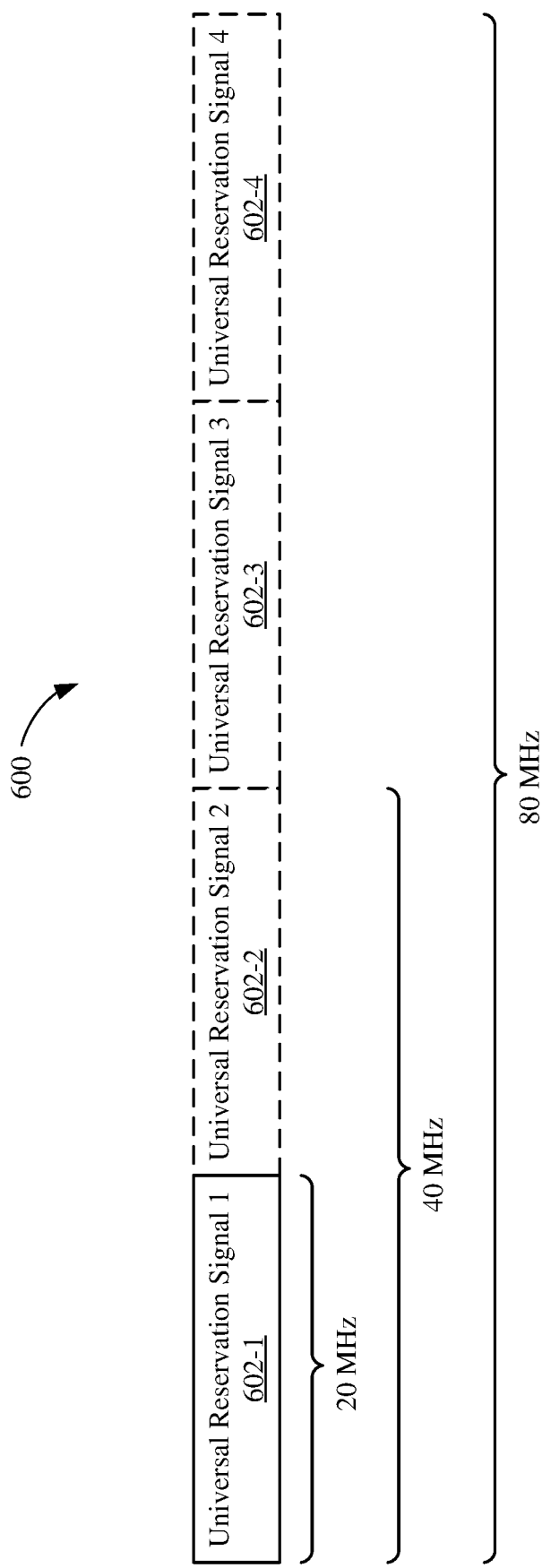
FIG. 6 is an illustration of an example combination of a number of example URS frames for different channel widths.

In some example implementations, the URS is for a 20 MHz channel in the 5 GHz frequency spectrum. For wider channels (such as a 40 MHz channel, an 80 MHz channel, and so on), the device may provide multiple instances of a URS frame, wherein the number of instances corresponds to the width of the channel. FIG. 6 is an illustration 600 of an example combination of a number of URS frames 602-1 through 602-4 for different channel widths.

If the minimum channel width for the URS is 20 MHz, URS 1 602-1 is transmitted to announce the length of the CBT. If the channel width is 40 MHz (where the minimum channel width is 20 MHz), two URS 602-1 and 602-2 may be stacked and transmitted to announce the length of the CBT. If the channel width is 80 MHz (where the minimum channel width is 20 MHz), four URS 602-1 through 602-4 may be stacked and transmitted to announce the length of the CBT. In some example implementations, the multiple URS frames for wider channels may be the same (with a Data Symbol 1 342-1 indicating the length of the CBT). The Data Symbol 2 may differ between URS frames, though, if Data Symbol 2 is ignored by the device receiving the URS (only Data Symbol 1 indicates the length of the CBT).

While some example frame formats of a URS are described above (such as URS 300 with Information Field 304, Information Field 304A, or Information Field 304B), other frame formats of a URS may exist. In one example, the Information Field of a URS may have more or less data symbols than two, three, or four. In some example implementations, a device is configured to be able to receive and process different formats of a URS (such as URSs with different Information Field formats).

Figure 7:
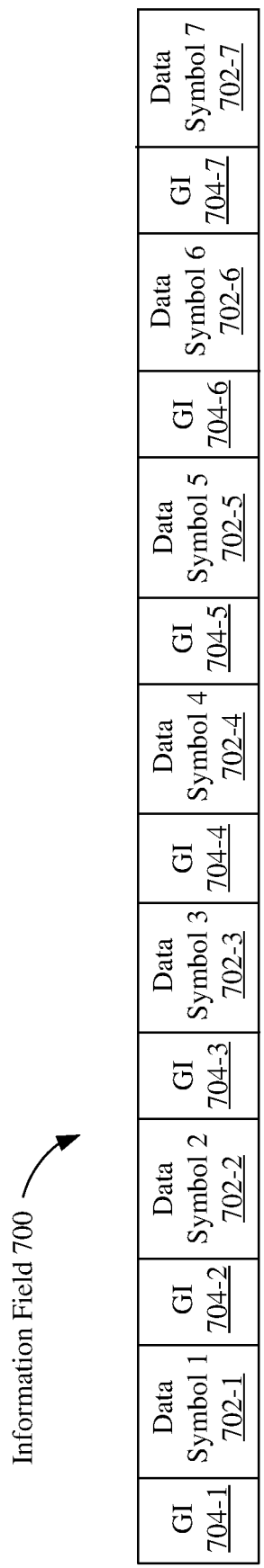
FIG. 7 is an illustration of another example Information Field in the URS in FIG. 3A.

FIG. 7 is an illustration of another example Information Field 700. The format of the Information Field of URS 300 may be Information Field 700 instead of Information Field 304, Information Field 304A, or Information Field 304B. Accordingly, at least two or three different types of URS may exist, depending on whether the format of the Information Field is Information Field 304, Information Field 304A, Information Field 304B, or Information Field 700. The Information Field 700 may include seven data symbols (Data Symbol 1 702-1 through Data Symbol 7 702-7). The Information Field 700 may also optionally include guard intervals separating the Data Symbols 1 702-1 through 7 702-7 (GI 704-1 through 704-7). Alternatively, the data symbols may be transmitted consecutively without guard intervals.

Each data symbol in Information Field 700 may contain 3 data octets. Example values of Data Symbols 1 702-1 through 7 702-7 are illustrated below (in hexadecimal notation and in transmit order from left to right):

| cb 01 00 | 00 00 c4 | 00 xx xx | rr rr rr | rr rr rr | yy yy yy | yy 00 00 |
| DS1 | DS2 | DS3 | DS4 | DS5 | DS6 | DS7 | where:
xx xx=length of CBT in µs;
rr=any hexadecimal value; and
yy yy yy yy=the value of a 32-bit cyclic redundancy check (CRC32) across [c4 00 xx xx rr rr rr rr rr rr].

URS 300 containing Information Field 700 may indicate that the length or duration of the CBT (indicated by two octets representing the number of µs) may be up to approximately 32 ms ($2^{15}$ µs=32,768 µs=32.768 ms). In some other example implementations, the URS 300 may indicate the length or duration of the CBT in terms of number or increment of symbols, bits, or bytes on the wireless channel, or another suitable unit of measure. The CBT may begin immediately following Data Symbol 7 702-7. For example, the CBT may begin immediately following a packet preamble if the URS 300 is included in a packet preamble. In other examples, the CBT may begin immediately following the packet including the URS 300, the CBT may begin at the beginning of the packet including the URS 300, or another suitable point.

In some example implementations, the value of Data Symbol 4 702-4 and Data Symbol 5 702-5 may be all is (hexadecimal value ff ff ff ff ff ff for the two data symbols). Accordingly, the value for the CRC32 (yy yy yy yy) may be determined across [c4 00 xx xx ff ff ff ff ff ff]. In some other example implementations, the value of Data Symbol 4 702-4 and Data Symbol 5 702-5 may be a Media Access Control (MAC) address. In one example, the MAC address is the transmitting device's MAC address. In another example, the MAC address is the broadcast address for broadcasting the URS. In some example implementations, a receiving device may ignore the values of Data Symbol 4 702-4 and Data Symbol 5 702-5. In ignoring the data symbols, Data Symbol 4 702-4 and Data Symbol 5 702-5 may be used only in affecting the CRC32 value yy yy yy yy. A receiving device may compare the CRC32 value yy yy yy yy to a CRC32 value locally generated across the received bits to determine if URS 300 was correctly received and/or to identify the type or frame format of the URS (such as whether the URS 300 contains Information Field 304 or Information Field 700).

In some example implementations, a receiving device may use the values of the first two bits of the last data octet from Data Symbol 2 702-2 (such as the first bit values 00 for the above hexadecimal value c4, which is 00100011 in binary notation) to differentiate the URS from different URS frame formats. For example, the receiving device identifies the URS as having an Information Field 700 instead of an Information Field 304 if the values of Data Symbol 2 702-2 and Data Symbol 3 702-3 is 00bbbbbb bbbbbbbb (in binary notation) where b may be 0 or 1 (bbbbbb bbbbbbbb may be any value). In some other example implementations, the receiving device may determine a CRC32 value across the last data octet of Data Symbol 2 702-2 through Data Symbol 5 702-5, as illustrated below:

| CRC32 across | zz | zz xx xx | rr rr rr | rr rr rr |
| | DS2 | DS3 | DS4 | DS5 | where zz zz may be any value. In this manner, a valid CRC32 value indicates the received URS having Information Field 700. In some example implementations, the format of the URS 300 is including Information Field 304, Information Field 304A, Information Field 304B, or Information Field 700.

Figure 8:
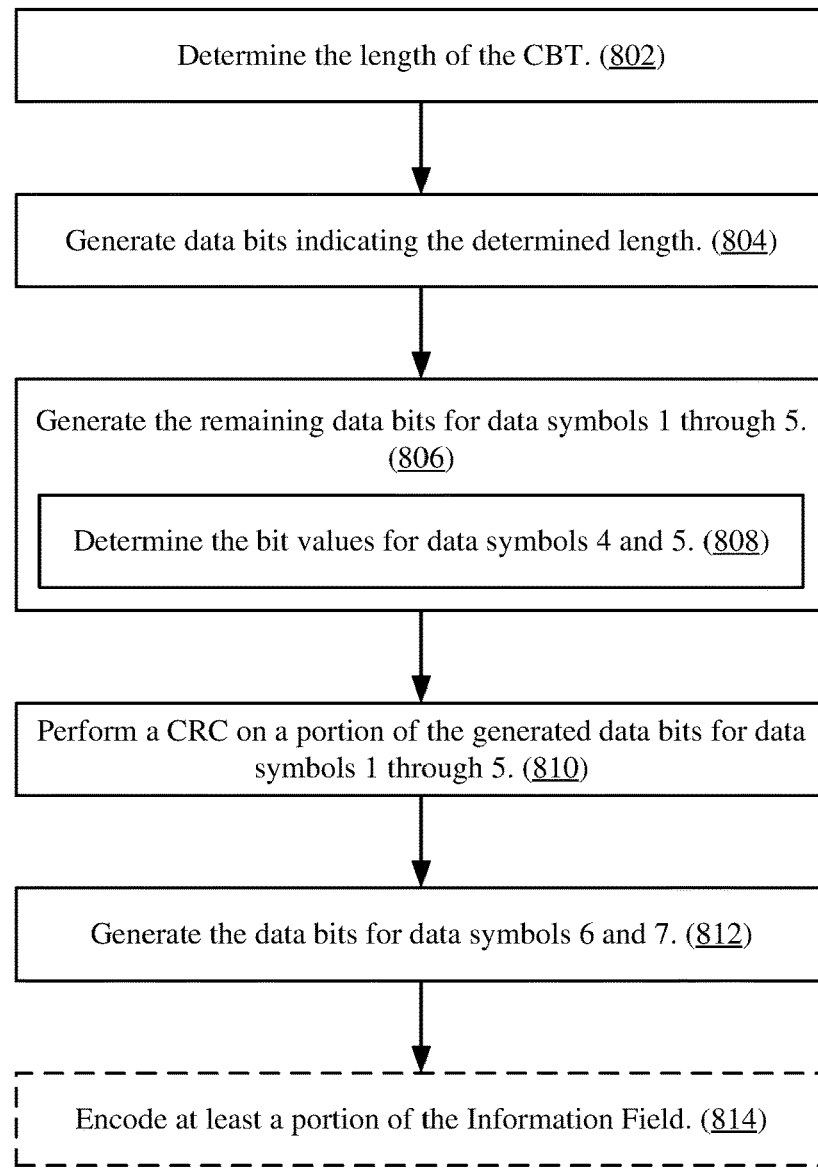
FIG. 8 is an illustrative flowchart depicting another example operation for generating the Information Field of a URS.

FIG. 8 is an illustrative flowchart depicting an example operation 800 for a device to generate Information Field 700. In some example implementations, example operation 800 may correspond to steps 502-505 of example operation

500 in FIG. 5. The device may first determine the length of the CBT (802). For example, the device may determine the CBT to be between 0 and approximately 32 ms. The device may then generate the data bits indicating the determined length (804). In one example, the device generates the values for the last two octets of Data Symbol 3 702-3 to indicate the length of the CBT.

The device may also generate the remaining data bits for Data Symbol 1 702-1 through Data Symbol 5 702-5 (806). Generating the remaining data bits includes determining the bit values for Data Symbol 4 702-4 and Data Symbol 5 702-5 (808). In one example, the bit values for data symbols 4 and 5 may be all 1s. In another example, the bit values may be the same as the MAC address of the device. In yet another example, the bit values may be the same as the broadcast address for broadcasting URS 300.

The device may then perform a CRC on a portion of the generated data bits for data symbols 1 through 5 (810). In one example, the device performs a 32-bit CRC across the last octet of Data Symbol 2 702-2 through Data Symbol 5 702-5 to determine, e.g., a 4 octet value for Data Symbol 6 702-6 through the first octet of Data Symbol 7 702-7. In one example, the value yy yy yy yy of Information Field 700 is the value of a CRC32 across [c4 00 xx xx rr rr rr rr rr rr] for the above example Information Field 700.

The device may then generate the data bits for Data Symbol 6 702-6 and Data Symbol 7 702-7 (812). In one example, Data Symbol 6 702-6 and the first octet of Data Symbol 7 702-7 is the CRC32 value yy yy yy yy. In some example implementations, the remainder of Data Symbol 7 702-7 (such as the last two octets) is zero padding.

In some example implementations, the device may optionally encode at least a portion of Information Field 700 for transmission (814). In one example, the device encodes Data Symbol 2 702-2 through Data Symbol 7 702-7, and the device leaves Data Symbol 1 702-1 unencoded for transmission. One example generator polynomial for encoding is the generator polynomial illustrated in equation (4) above. However, any suitable generator polynomial may be used by the device for encoding.

In some example implementations, the device transmits a URS prior to each time the device is to cause activity on a channel (such as transmitting or initiating a transmission). The receiving devices may thus consider the channel busy for the duration of the CBT indicated by the URS. Accordingly, a receiving device prevents transmitting or initiating a transmission for the indicated duration of the CBT. In one example, a device transmits a URS 300 with an Information Field 304 or Information Field 700, and the device adheres to a CBT indicated in a received URS 300 with an Information Field 304 or Information Field 700. In another example, a device transmits a URS 300 with an Information Field 304, Information Field 304A, or Information Field 700, and the device adheres to a CBT indicated in a received URS 300 with an Information Field 304, Information Field 304A, or Information Field 700. In a further example, a device transmits a URS 300 with an Information Field 304, Information Field 304B, or Information Field 700, and the device adheres to a CBT indicated in a received URS 300 with an Information Field 304, Information Field 304B, or Information Field 700.

The URS may indicate a CBT for the wireless device transmitting the URS. Alternatively, the URS may indicate a CBT for another wireless device that is to occupy the wireless channel. For example, an AP may transmit the URS for a STA in the wireless network, or a STA may transmit the URS for another STA in a wireless network. The present disclosure should not be limited to the device transmitting the URS occupying the wireless channel during the CBT.

Figure 9:
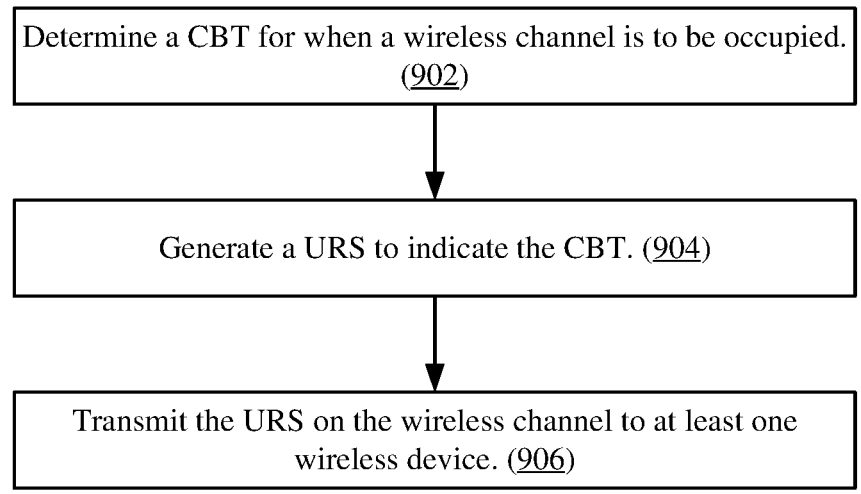
FIG. 9 is an illustrative flowchart depicting an example operation for transmitting a URS.
Figure 10:
FIG. 10 is an illustrative flowchart depicting an example operation for receiving a URS.

FIGS. 9 and 10 are illustrative flowcharts depicting example operations for transmitting and receiving, respectively, a URS. FIG. 9 is an illustrative flowchart depicting an example operation 900 for transmitting a URS. Beginning at 902, a wireless device may determine a CBT during which the wireless channel is to be occupied. In some examples, the wireless device is to occupy the wireless channel during the CBT. In some other examples, a second wireless device is to occupy the wireless channel during the CBT. Some example implementations of determining the CBT may be as described above for 802 in FIG. 8. For example, a processor 230 may determine the amount of time (or a duration in another unit of measure) that the wireless device (or a second wireless device) is to transmit on the wireless channel. The wireless device may then generate a URS to indicate the CBT (904). Some example implementations of generating the URS may be as described above for FIG. 4, FIG. 5, or FIG. 8. The wireless device may then transmit the URS on the wireless channel (906). The transmission is to at least one wireless device other than the wireless device to occupy the wireless channel during the CBT. For example, the URS may be multicast, broadcast, or any other suitable transmission from the wireless device to another wireless device.

FIG. 10 is an illustrative flowchart depicting an example operation 1000 for receiving a URS. Beginning at 1002, a wireless device may receive on a wireless channel a URS from a second wireless device. The URS may be configured to indicate a CBT during which the wireless channel is to be occupied (by the transmitting wireless device or another wireless device). For example, the wireless device may receive a packet including the URS (such as included in the packet preamble) to indicate the CBT that the wireless channel is to be occupied by the transmitting device or another device other than the transmitting and receiving devices.

The wireless device may then refrain from transmitting on the wireless channel during the CBT (1004). For example, the wireless device may determine, from the received URS, the CBT during which the wireless channel is to be occupied. In some example implementations, such as the example information fields of a URS described above, the wireless device may process an information field of the URS to determine the CBT. For example, the wireless device may determine the duration of a CBT based on one or more data symbols of the URS, and the wireless device may refrain from transmitting on the wireless channel for the duration of the CBT. The duration of the CBT may begin at the end of receiving the URS, such as the packet preamble, may begin at the end of receiving the packet including the URS, may begin at the beginning of the packet, or any other suitable point.

Alternatively, the wireless device may determine an end time for the CBT for which the wireless device ends refraining from transmitting on the wireless channel. In this manner, the wireless device may end refraining from transmitting (or attempting to transmit) on the wireless channel at or after the end time. The wireless device may begin refraining from transmitting at any predefined point (such as when receiving the packet including the URS).

In refraining from transmitting, the wireless device may set a clear channel assessment (CCA) flag to high (1) to indicate that the wireless channel is busy. The wireless device may also set a timer or counter based on the length of the CBT. At the expiration of the timer or time using a counter, the wireless device may reset the CCA flag to low (0). The CCA flag may be used by the wireless device to determine whether the wireless device may attempt to access or reserve the wireless channel for transmission. Alternatively, the wireless device may reset the CCA flag when an internal timer reaches the determined end time.

In the foregoing specification, aspects of the present disclosure have been described with reference to specific example implementations thereof. It will, however, be evident that various modifications and changes may be made thereto without departing from the broader scope of the disclosure as set forth in the appended claims. For example, method steps depicted in the flow charts of FIGS. 4, 5, and 8-10 may be performed in other suitable orders and/or one or more method steps may be omitted. Additionally, while specific numbers, multiples, and ratios have been provided in some examples, they are provided for illustrative purposes. The present disclosure should not be limited to those specific examples, and the specification and drawings are, accordingly, to be regarded in an illustrative sense rather than a restrictive sense.

What is claimed is:

1. A wireless device, comprising:
    one or more transceivers configured to receive, on a wireless channel, a universal reservation signal in a broadcast packet from a second wireless device, the universal reservation signal configured to indicate an upcoming channel busy time during which the wireless channel is to be occupied by the second wireless device, wherein the broadcast packet includes a training field indicating the beginning of the broadcast packet and an information field including a number representing a duration of time, in units of time, of the upcoming channel busy time;
    a processor; and
    a non-transitory computer-readable storage medium coupled to the processor and storing one or more programs containing instructions that, when executed by the processor of the wireless device, cause the wireless device to refrain from transmitting on the wireless channel during the upcoming channel busy time.

2. The wireless device of claim 1, wherein the instructions further cause the wireless device to:
    process bits of the training field to synchronize the wireless device with the second wireless device; and
    process bits of the information field to determine the upcoming channel busy time.

3. The wireless device of claim 2, wherein the instructions for processing bits of the information field cause the wireless device to:
    process a first data symbol of the information field in determining the upcoming channel busy time; and
    ignore a second data symbol of the information field in response to processing the first data symbol.

4. The wireless device of claim 2, wherein the wireless channel includes a first frequency portion and a second frequency portion, and wherein the broadcast packet includes an instance of the universal reservation signal in each of the first and the second frequency portions.

5. The wireless device of claim 2, wherein the instructions for processing bits of the information field cause the wireless device to determine, from the number included in the information field, the duration of time that the wireless channel is to be occupied, wherein the number represents the duration of time in time increments.

6. The wireless device of claim 5, wherein the instructions for refraining from transmitting cause the wireless device to refrain from transmitting during the duration of time, wherein the duration of time begins at the end of receiving the information field.

7. The wireless device of claim 2, wherein:
    the instructions for processing bits of the information field cause the wireless device to determine an end time for the upcoming channel busy time; and
    the instructions for refraining from transmitting cause the wireless device to end refraining from transmitting at or after the end time.

8. A method, comprising:
    receiving by a wireless device on a wireless channel a universal reservation signal in a broadcast packet from a second wireless device, the universal reservation signal configured to indicate an upcoming channel busy time during which the wireless channel is to be occupied by the second wireless device, wherein the broadcast packet includes a training field indicating the beginning of the packet and an information field including a number representing a duration of time, in units of time, of the upcoming channel busy time; and
    refraining from transmitting on the wireless channel during the channel busy time.

9. The method of claim 8, further comprising:
    processing bits of the training field to synchronize the wireless device with the second wireless device; and
    processing bits of the information field to determine the upcoming channel busy time.

10. The method of claim 9, wherein processing bits of the information field comprises:
    processing a first data symbol of the information field in determining the upcoming channel busy time; and
    ignoring a second data symbol of the information field in response to processing the first data symbol.

11. The method of claim 9, wherein processing bits of the information field comprises determining, from the number included in the information field, the duration of time that the wireless channel is to be occupied, wherein the number represents the duration of time in time increments.

12. The method of claim 11, wherein refraining from transmitting comprises refraining from transmitting during the duration of time, wherein the duration of time begins at the end of receiving the information field.

13. The method of claim 9, wherein:
    processing bits of the information field comprises determining an end time for the upcoming channel busy time; and
    refraining from transmitting comprises end refraining from transmitting at or after the end time.

14. The method of claim 9, wherein the wireless channel includes a first frequency portion and a second frequency portion, and wherein receiving the broadcast packet includes receiving an instance of the universal reservation signal in each of the first and the second frequency portions.

15. A wireless device, comprising:
    a processor;
    a non-transitory computer-readable storage medium coupled to the processor and storing one or more programs containing instructions that, when executed by the processor of the wireless device, cause the wireless device to:
        determine an upcoming channel busy time during which a wireless channel is to be occupied by the wireless device; and generate a broadcast packet including a universal reservation signal indicating the upcoming channel busy time; and one or more transceivers configured to broadcast the broadcast packet including the universal reservation signal on the wireless channel to at least one wireless device, wherein the broadcast packet includes a training field indicating the beginning of the packet and an information field including a number representing a duration of time of the upcoming channel busy time.

16. The wireless device of claim 15, wherein the instructions for generating the broadcast packet cause the wireless device to:

generate bits of the training field for synchronizing the at least one wireless device with the wireless device; and generate bits of the information field for indicating the upcoming channel busy time.

17. The wireless device of claim 16, wherein the instructions for generating bits of the information field cause the device to:

generate a first data symbol of the information field to indicate the upcoming channel busy time; and generate a second data symbol of the information field for padding the broadcast packet.

18. The wireless device of claim 16, wherein the instructions for generating bits of the information field cause the wireless device to generate the number included in the information field, wherein the number represents in time increments the duration of time that the wireless channel is to be occupied.

19. The wireless device of claim 16, wherein the instructions for generating bits of the information field cause the wireless device to generate an information field to be used by the at least one wireless device to determine an end time for the upcoming channel busy time, wherein the at least one wireless device is to end refraining from transmitting at or after the end time.

20. The wireless device of claim 16, wherein the wireless channel includes a first frequency portion and a second frequency portion, and wherein the instructions for generating the broadcast packet cause the device to include an instance of the universal reservation signal in each of the first and the second frequency portions.

21. A method, comprising:

determining by a wireless device an upcoming channel busy time during which a wireless channel is to be occupied by the wireless device;

generating a broadcast packet including a universal reservation signal indicating the upcoming channel busy time; and broadcasting the broadcast packet including the universal reservation signal on the wireless channel to at least one wireless device, wherein the broadcast packet includes a training field indicating the beginning of the packet and an information field including a number representing a duration of time, in units of time, of the upcoming channel busy time.

22. The method of claim 21, wherein generating the broadcast packet comprises:

generating bits of the training field for synchronizing the at least one wireless device with the wireless device; and generating bits of the information field for indicating the upcoming channel busy time.

23. The method of claim 22, wherein generating bits of the information field comprises:

generating a first data symbol of the information field to indicate the upcoming channel busy time; and generating a second data symbol of the information field for padding the packet.

24. The method of claim 22, wherein generating bits of the information field comprises generating the number included in the information field, wherein the number represents in time increments the duration of time that the wireless channel is to be occupied.

25. The method of claim 22, wherein generating bits of the information field comprises generating an information field to be used by the at least one wireless device to determine an end time for the upcoming channel busy time, wherein the at least one wireless device is to end refraining from transmitting at or after the end time.

26. The method of claim 22, wherein the wireless channel includes a first frequency portion and a second frequency portion, and wherein generating the broadcast packet comprises including an instance of the universal reservation signal in each of the first and the second frequency portions.

* * * * *